US012177396B2

United States Patent
Yokoyama

(10) Patent No.: US 12,177,396 B2
(45) Date of Patent: Dec. 24, 2024

(54) IMAGE READING DEVICE DETERMINING TRANSMISSION DESTINATION

(71) Applicant: Akira Yokoyama, Kanagawa (JP)

(72) Inventor: Akira Yokoyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/389,230

(22) Filed: Nov. 14, 2023

(65) Prior Publication Data

US 2024/0179256 A1 May 30, 2024

(30) Foreign Application Priority Data

Nov. 29, 2022 (JP) .................................. 2022-190805
Jun. 27, 2023 (JP) .................................. 2023-105398

(51) Int. Cl.
*H04N 1/00* (2006.01)

(52) U.S. Cl.
CPC ....... *H04N 1/00801* (2013.01); *H04N 1/0001* (2013.01); *H04N 1/00013* (2013.01); *H04N 1/00042* (2013.01); *H04N 1/00816* (2013.01); *H04N 1/00824* (2013.01)

(58) Field of Classification Search
CPC ........... H04N 1/00824; H04N 1/00013; H04N 1/0001; H04N 1/00801
USPC ....................................... 358/1.15, 505, 405
See application file for complete search history.

(56) References Cited

U.S. PATENT DOCUMENTS

| 5,907,632 | A | 5/1999 | Suzuki |
| 2006/0017950 | A1* | 1/2006 | Ikegami ............. H04N 1/00342 358/1.13 |
| 2008/0018952 | A1 | 1/2008 | Du et al. |
| 2016/0366299 | A1* | 12/2016 | Sato .................... H04N 1/32427 |
| 2021/0289098 | A1 | 9/2021 | Mori et al. |

FOREIGN PATENT DOCUMENTS

| JP | 9-069907 A | 3/1997 |
| JP | 2012-034023 A | 2/2012 |
| JP | 2014-017737 A | 1/2014 |
| JP | 2017-224955 A | 12/2017 |

* cited by examiner

*Primary Examiner* — Jamares Q Washington
(74) *Attorney, Agent, or Firm* — XSENSUS LLP

(57) ABSTRACT

An image reading device, an image reading method, a non-transitory recording medium, and an information processing system. The image reading device includes a scanner to read a document into an image, determines a document type of the document based on the image, determines whether to confirm the predetermined destination based on a frequency with which an image of the determined document type is transmitted to the predetermined destination, displays on a display, a screen to confirm the predetermined destination based on a determination indicating that the predetermined destination is to be confirmed, and transmits the image to the predetermined destination based on a confirmation.

9 Claims, 13 Drawing Sheets

FIG. 4

INVOICE

TO: ABC COMPANY

No 1234
DATE: OCTOBER 10, 2022

WE INVOICE AS FOLLOWS

| SUBJECT | XX DEVICE |
|---|---|
| DUE DATE | NOVEMBER 30, 2022 |
| PAY TO | BANK DEF ACCOUNT NO.1234567 |

XYZ COMPANY
TOKYO JAPAN
TEL 123 4567 8910

| TOTAL | 1,353,000 YEN INCLUDING TAX |
|---|---|

| ITEM | QUANTITY | UNIT | UNIT PRICE | AMOUNT |
|---|---|---|---|---|
| BASE DEVICE | 1 | SET | 1,000,000 | 1,000,000 |
| PART 345678 | 1 | SET | 200,000 | 200,000 |
| PART 567890 | 1 | SET | 30,000 | 30,000 |
| | | | | |
| | | | | |
| | | | | |
| | | | | |
| | | | | |
| | | | | |
| | | | | |
| | | | | |
| | | | SUB TOTAL | 1,230,000 |
| | | | TAX | 123,000 |
| | | | TOTAL | 1,353,000 |

FIG. 6

| DOCUMENT TYPE | KEYWORD 1 | KEYWORD 2 | KEYWORD 3 | KEYWORD 4 |
|---|---|---|---|---|
| INVOICE | BILL | CHECK | ACCOUNT | INVOICE |
| BILL OF DELIVERY | BILL OF DELIVERY | DELIVERY SLIP | | |
| TRANSPORTATION EXPENSE RELATED DOCUMENT | TRANSPORTATION EXPENSE | TRAVELLING COST | TAXI FARE | |
| MEETING MATERIAL | MEETING | MINUTES | | |

FIG. 7A

| USER ID | DESTINATION | DOCUMENT TYPE | NUMBER OF TRANSMISSIONS | LAST TRANSMITTED DATE |
|---|---|---|---|---|
| USER A | houmu@xyz.com | CONTRACT | 5 | AUGUST 25, 2022 |
| USER B | doc@xyz.com | BILL OF DELIVERY | 36 | MARCH 30, 2022 |
| USER B | doc_new@xyz.com | BILL OF DELIVERY | 12 | SEPTEMBER 2, 2022 |
| USER B | ... | | | |
| ... | | | | |

FIG. 7B

| USER ID | DESTINATION | DOCUMENT TYPE | NUMBER OF TRANSMISSIONS | LAST TRANSMITTED DATE |
|---|---|---|---|---|
| USER A | houmu@xyz.com | CONTRACT | 5 | AUGUST 25, 2022 |
| USER A | keiri@xyz.com | INVOICE | 1 | SEPTEMBER 14, 2022 |
| USER B | doc@xyz.com | BILL OF DELIVERY | 36 | MARCH 30, 2022 |
| USER B | doc_new@xyz.com | BILL OF DELIVERY | 12 | SEPTEMBER 2, 2022 |
| USER B | ... | | | |
| ... | | | | |

FIG. 8

This is the first time to send
this type of document to the specified
destination. Is the destination correct?

Destination: keiri@xyz.com
Document type: Invoice

[ Yes ]   [ No ]

FIG. 9

This type of document is not sent to
the specified destination since five
months. Is the destination correct?

Destination: doc@xyz.com
Document type: Bill of delivery

[ Yes ]   [ No ]

IMAGE READING DEVICE DETERMINING TRANSMISSION DESTINATION

CROSS-REFERENCE TO RELATED APPLICATIONS

This patent application is based on and claims priority pursuant to 35 U.S.C. § 119(a) to Japanese Patent Application No. 2022-190805, filed on Nov. 29, 2022, and No. 2023-105398 filed on Jun. 27, 2023, in the Japan Patent Office, the entire disclosure of each is hereby incorporated by reference herein.

BACKGROUND

Technical Field

The present disclosure relates to an image reading device, an image reading method, a non-transitory recording medium, and an information processing system.

Background Art

In order to prevent erroneous transmission by facsimile, a technique for preventing erroneous transmission is disclosed in which a facsimile number input by a user is searched on the web to confirm whether the facsimile number actually exists, and a confirmation result is displayed to the user.

SUMMARY

Embodiments of the present disclosure describe an image reading device, an image reading method, a non-transitory recording medium, and an information processing system.

According to one embodiment, the image reading device includes a scanner to read a document into an image, determines a document type of the document based on the image, determines whether to confirm the predetermined destination based on a frequency with which an image of the determined document type is transmitted to the predetermined destination, displays on a display, a screen to confirm the predetermined destination based on a determination indicating that the predetermined destination is to be confirmed, and transmits the image to the predetermined destination based on a confirmation.

According to one embodiment, the image reading method includes reading a document into an image, the image to be transmitted to a predetermined destination, determining a document type of the document based on the image, determining whether to confirm the predetermined destination based on a frequency with which the image of the determined document type is transmitted to the predetermined destination, displaying, on a display, a screen to confirm the predetermined destination based on a determination indicating that the predetermined destination is to be confirmed, and transmitting the image to the predetermined destination based on a confirmation.

According to one embodiment, the information processing system includes an image reading device and a server, wherein the image reading device includes a scanner to read a document into an image, and the server determines a document type of the document based on the image read by the image reading device and determines whether to confirm a predetermined destination based on a frequency with which the image of the determined document type is transmitted to the predetermined destination, and the image reading device further displays on a display, a screen to confirm the predetermined destination based on a determination that the predetermined destination is to be confirmed and transmits the image to the predetermined destination based on a confirmation.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 4 is a diagram illustrating an example of document type determination process in the MFP according to the first embodiment;

FIG. 6 is a diagram illustrating an example of keywords used to determine the document type in the information processing system according to the first embodiment:

FIG. 7A is a diagram illustrating an example of a transmission history stored in the information processing system according to the first embodiment;

FIG. 7B is a diagram illustrating another example of the transmission history stored in the information processing system according to the first embodiment;

FIG. 8 is a diagram illustrating an example of a confirmation message displayed by the information processing system according to the first embodiment:

FIG. 9 is a diagram illustrating another example of the confirmation message displayed by the information processing system according to the first embodiment;

Figure 1:
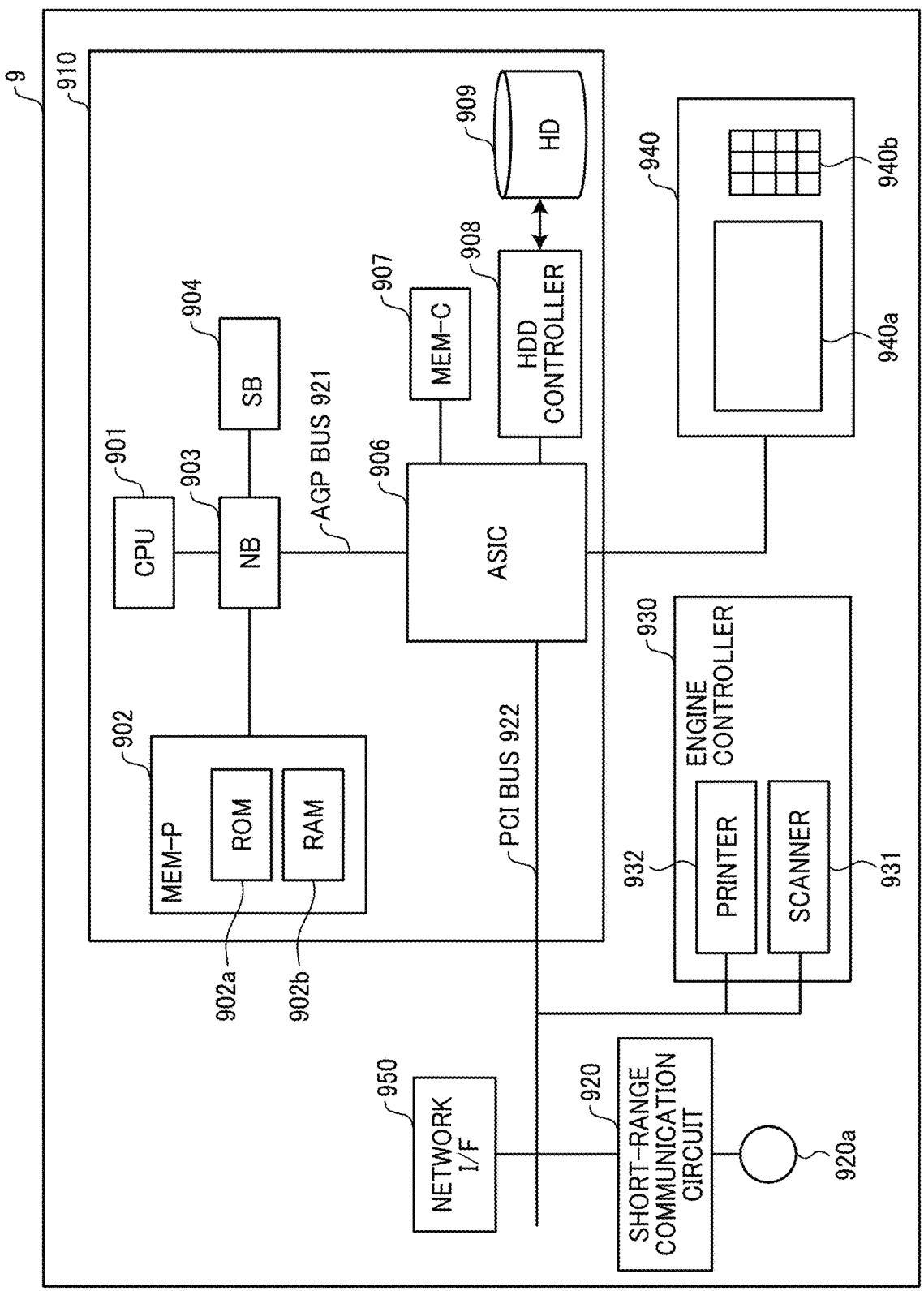
FIG. 1 is a block diagram illustrating a hardware configuration of a multifunction peripheral (MFP), which is an example of an image reading device according to a first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of an image reading device, an image reading method, a non-transitory recording medium, and an information processing system are described below in detail with reference to the accompanying drawings.

FIG. 1 is a block diagram illustrating a hardware configuration of an MFP, which is an example of an image reading device, according to a first embodiment. As illustrated in FIG. 1, the MFP 9 includes a controller 910, a short-range communication circuit 920, an engine controller 930, an operation panel 940, and a network interface (I/F) 950.

The controller 910 includes a central processing unit (CPU) 901 as a main processor, a system memory (MEM-P) 902, a north bridge (NB) 903, a south bridge (SB) 904, an Application Specific Integrated Circuit (ASIC) 906, a local memory (MEM-C) 907 as a storage unit, a hard disk drive (HDD) controller 908, and a hard disk (HD) 909 as the storage unit. The NB 903 and the ASIC 906 are connected through an Accelerated Graphics Port (AGP) bus 921.

The CPU 901 is a processor that performs overall control of the MFP 9. The NB 903 connects the CPU 901 with the MEM-P 902, SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a read only memory (ROM) 902a, which is a memory for storing programs (operating system (OS), application, and the like) and data that implement each function of the controller 910, and a RAM 902b used for developing programs and data, and as a drawing memory in memory printing. The program stored in the ROM 902a may be stored in any computer-readable storage medium, such as a compact disc-read only memory (CD-ROM), compact disc-recordable (CD-R), or digital versatile disc (DVD), in a file format installable or executable by the computer for distribution.

The SB 904 is a bridge for connecting the NB 903 with a peripheral component interconnect (PCI) device or a peripheral device. The ASIC 906 is an integrated circuit (IC) dedicated to an image processing use, and is a bridge that connects the AGP bus 921, a PCI bus 922, the HDD controller 908, and the MEM-C 907.

The ASIC 906 includes a PCI target and an AGP master, an arbiter (ARB) that is the core of the ASIC 906, a memory controller that controls the MEM-C 907, and multiple Direct Memory Access Controllers (DMACs) that rotate image data using hardware logic and the like, and a PCI unit that transfers data between a scanner 931 and a printer 932 through the PCI bus 922.

The ASIC 906 may be connected to a Universal Serial Bus (USB) interface, or an Institute of Electrical and Electronics Engineers 1394 (IEEE1394) interface.

The MEM-C 907 is a local memory used as a copy image buffer and a code buffer. The HD 909 is a storage for accumulating image data, accumulating font data used for printing, and accumulating forms. The HD 909 also stores device settings, user information, address books, transmission history, and the like. The HDD controller 908 reads or writes various data from or to the HD 909 under control of the CPU 901. The AGP bus 921 is a bus interface for a graphics accelerator card which has been proposed to accelerate graphics processing. Through directly accessing the MEM-P 902 by high-throughput, speed of the graphics accelerator card is improved.

The short-range communication circuit 920 is provided with a short-range communication antenna 920a. The short-range communication circuit 920 is a communication circuit that communicates in compliance with near field communication (NFC) (Registered Trademark), BLUETOOTH (Registered Trademark), and the like. The engine controller 930 includes the scanner 931 and the printer 932. The operation panel 940 includes a display panel 940a implemented by, for example, a touch panel that displays current settings or a selection screen and receives a user input and control panel 940b that includes a numeric keypad that receives set values of various image forming parameters such as image density parameter and a start key that receives an instruction to start copying.

The operation panel 940 is used to display information from the OS, application, and the like, or to receive instruction from the user. The controller 910 controls entire operation of the MFP 9. For example, the controller 910 controls rendering, communication, or user inputs to the operation panel 940. The scanner 931 or the printer 932 includes an image processor to perform error diffusion processing, gamma conversion processing, and the like. The scanner 931 is an example of a reading unit to read a document such as a paper document. The printer 932 is a device to print a read paper document or an electronic image sent from a personal computer (PC) or the like onto transfer paper. Although the MFP 9, which is an example of the image reading device according to the present embodiment, is provided with the printer 932 in FIG. 1, the printer 932 is not provided in another example. The image reading device according to the present embodiment may be a stand-alone scanner device or the like instead of the MFP.

In response to an instruction to select a specific application through the operation panel 940, for example, using a mode switch key, the MFP 9 selectively performs a document box function, a copy function, a print function, and a facsimile function. The document box mode is selected when the document box function is selected, the copy mode is selected when the copy function is selected, the print mode is selected when the print function is selected, and the facsimile mode is selected when the facsimile function is selected.

The network I/F 950 controls communication of data with an external device through a communication network. The network I/F 950 enables a network communication function such as ETHERNET (registered trademark), Wi-Fi (registered trademark), modem, or the like. The short-range communication circuit 920 and the network I/F 950 are electrically connected to the ASIC 906 through the PCI bus 922.

Figure 2:
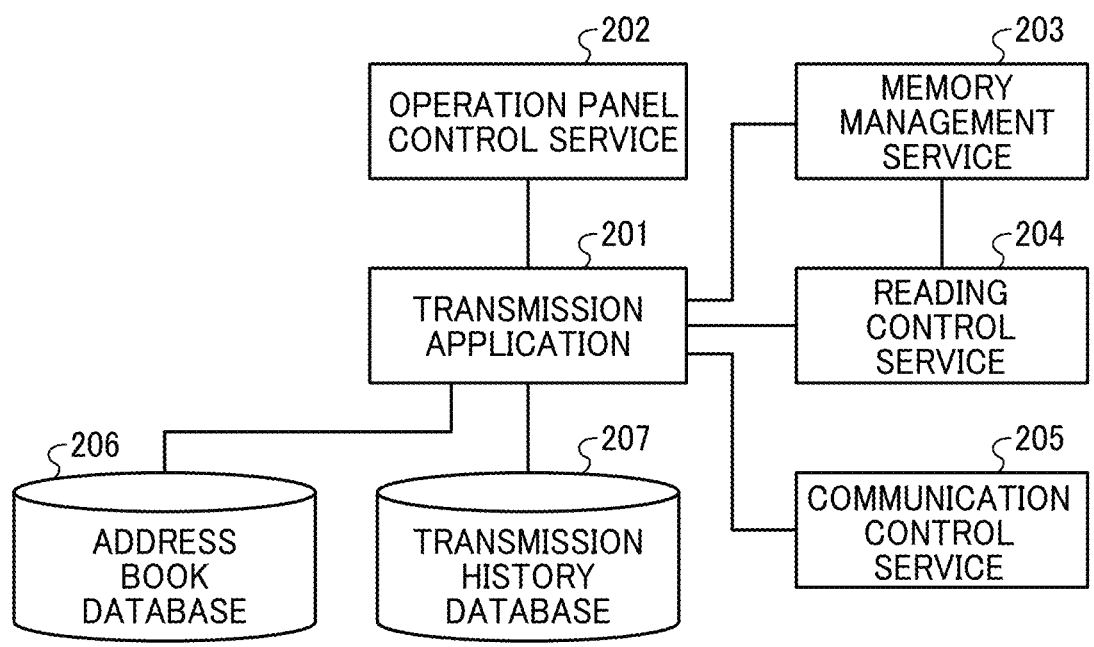
FIG. 2 is a block diagram illustrating an example of a functional configuration of the MFP according to the first embodiment.

FIG. 2 is a block diagram illustrating an example of a functional configuration of the MFP according to the first embodiment.

Figure 3:
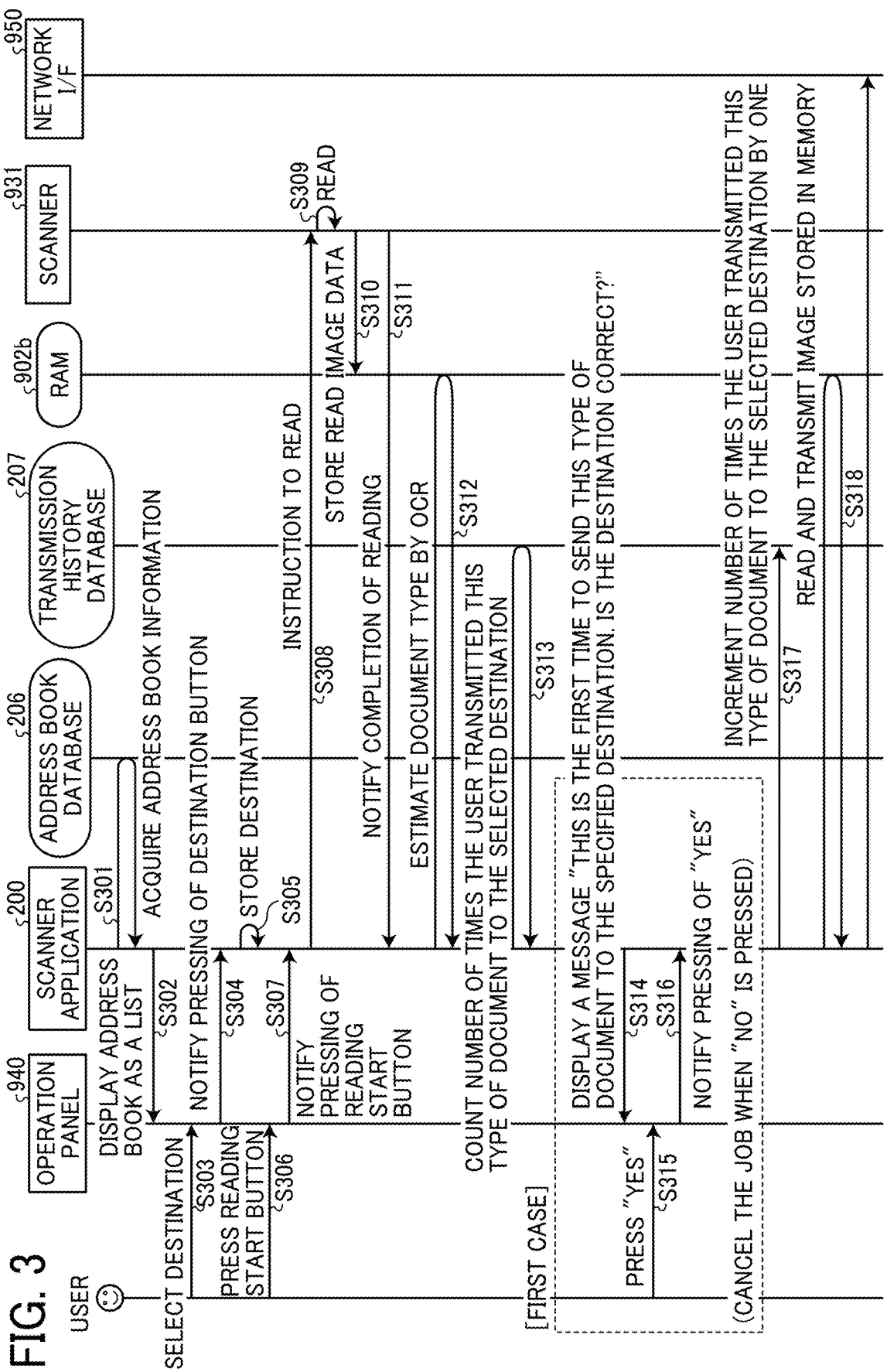
FIG. 3 is a sequence diagram illustrating an example of a process to prevent an erroneous transmission in the MFP according to the first embodiment.

In the MFP 9 according to the present embodiment, the CPU 901 uses the RAM 902b as a work area and executes a program such as a scanner application 200 (see FIG. 3)

stored in the ROM 902a, and implements a transmission application 201, an operation panel control service 202, a memory management service 203, a reading control service 204, and a communication control service 205 as illustrated in FIG. 2. In other words, the scanner application 200 includes the transmission application 201, the operation panel control service 202, the memory management service 203, the reading control service 204, and the communication control service 205. Furthermore, the MFP 9 according to the present embodiment implements an address book database 206 and a transmission history database 207 using a storage medium such as the HD 909.

The address book database 206 is a database in which transmission destinations such as facsimile numbers, email addresses, folder paths, and the like and users who use devices such as the MFP 9, and user identification information (user ID) are registered.

The transmission history database 207 is a database to record the number of times the image was sent and the date of the last transmission for each user ID of the user who sent the image, the destination to which the image was sent, and the document type of to which the image was sent.

The transmission application 201 implements functions such as facsimile transmission, email, or folder transmission.

Specifically, the transmission application 201 is an example of a transmission unit to transmit an image read by the scanner 931 to a predetermined destination. A transmission to the predetermined destination includes facsimile transmission, email transmission, transmission to a predetermined storage location (folder), and the like.

Further, the transmission application 201 is an example of a user identification unit that uses the address book database 206 to identify a user using the MFP 9. The transmission application 201 is an example of a recording function unit that uses the transmission history database 207 to record a transmission history including destinations to which an identified user sent images in the past.

The transmission application 201 is an example of a determination unit that determines whether to confirm the destination based on a transmission frequency, which is the frequency with which images of the document type read by the scanner 931 are transmitted to the predetermined destination. Specifically, the transmission application 201 determines whether the predetermined destination is a destination used for the first time by the user or a frequently used destination based on the recorded transmission history, and depending on the transmission frequency including a result of the determines, determines whether to confirm the destination. The transmission frequency may be the number of transmissions (including 0 times), the period from the previous transmission to the current transmission, and the like, which are calculated based on the transmission history.

Furthermore, in the case an image of the determined document type is being sent to the predetermined destination for the first time, the transmission application 201 determines that the destination is to be confirmed. Accordingly, in the case the user is transmitting to the specified destination for the first time, determination of whether to confirm the destination is not possible since there is no transmission history. In this case, by having the user confirm the destination, the possibility of erroneous image transmission is reduced.

Furthermore, in the case the image of the determined document type is not sent to the predetermined destination for more than a predetermined period of time (for example, five months), the transmission application 201 determines that the destination is to be confirmed. In the case the transmission history is from many months ago, the destination may no longer be correct due to organizational change or the like. In this case, by having the user confirm the destination, the possibility of erroneous image transmission is reduced.

The operation panel control service 202 displays a user interface (UI) for using the transmission application 201 on a screen of the operation panel 940 according to instructions from the transmission application 201. Further, in response to an operation on the touch panel, buttons, and the like, the operation panel control service 202 notifies the transmission application 201. Specifically, based on determination by the operation panel control service 202 that a transmission destination of the image read by the scanner 931 is to be confirmed, the operation panel control service 202, which is an example of a display control unit, displays a display screen including a confirmation message to confirm the destination on a display unit such as the operation panel 940. Accordingly, based on determination that the destination of the document is to be confirmed, the user can confirm the destination, resulting in reduction of erroneous transmission of the document. The application is a program that implements a function provided to a user (for example, a function to read a document and send an email, a function to read and print a document). Further, the term "service" refers to a program that provides a function commonly used by an application (for example, a function to control the scanner 931 and read a document according to an instruction from the application, or a function to display a screen on the operation panel 940 according to an instruction from the application).

The memory management service 203 is responsible for temporarily storing the read image data in the RAM 902b.

The reading control service 204 operates the scanner 931 according to an instruction from the transmission application 201 to read a paper document, and stores the read document as image data to the RAM 902b managed by the memory management service 203. Further, the reading control service 204 is an example of a determination unit to determine the document type based on the image read by the scanner 931. Further, the reading control service 204 may determine the document type using optical character recognition (OCR) technology, which is an example of a character recognition technology. Thereby, the user's effort can be reduced by automatically determining the document type.

The communication control service 205 controls devices for performing network communication such as ETHERNET (registered trademark), Wi-Fi (registered trademark), modem, and the like.

FIG. 3 is a sequence diagram illustrating an example of a process to prevent the erroneous transmission in the MFP according to the first embodiment. The user logs into the MFP 9. For example, methods for logging into the MFP 9 include inputting a user name and password, and holding an integrated circuit (IC) card distributed to each user over a card reader.

In step S301, in response to a login by the user to the MFP 9, the transmission application 201 included in the scanner application 200 acquires an address book from the address book database 206. In step S302, the operation panel control service 202 included in the scanner application 200 displays the acquired address book on the operation panel 940.

In step S303, the user selects a destination (an example of a predetermined destination) from the address book displayed on the screen by the operation panel control service 202 of the scanner application 200 (or directly enters the e-mail address, or the like of the destination). In response to a notification from the operation panel 940 that the destination is selected in step S304, the transmission application 201 included in the scanner application 200 temporarily stores the destination in step S305.

In response to the user setting a document and pressing a reading start button in step S306, the operation panel 940 notifies the operation panel control service 202 included in the scanner application 200 that the reading start button is pressed in step S307. In step S308, the reading control service 204 included in the scanner application 200 instructs the scanner 931 to read the document. The scanner 931 reads the document in step S309, stores the image data in the RAM 902*b* in step S310, and notifies the reading control service 204 of the scanner application 200 of completion of reading in step S311.

In step S312, the reading control service 204 included in the scanner application 200 refers to the image data stored in the RAM 902*b*, performs character recognition such as OCR, and infers (determines) the document type. In the present embodiment, the document type is determined by OCR, but this sequence is almost the same even when the document type is automatically determined by methods other than OCR.

In step S313, the transmission application 201 included in the scanner application 200 searches and examines the transmission history stored in the transmission history database 207 and calculates the number of times the logged-in user sent the determined document type to the selected destination. In the case the determined document type is not sent to the selected destination, the operation panel control service 202 of the scanner application 200 displays a confirmation message on the operation panel 940 such as "This is the first time to send this type of document to the specified destination. Is the destination correct?" in step S314. In response to a pressing of a "Yes" button by the user in step S315, the operation panel 940 notifies the operation panel control service 202 of the scanner application 200 that the "yes" button is pressed in step S316. On the other hand, in response to a pressing of the "No" button, the transmission application 201 included in the scanner application 200 cancels the job and ends the process.

In response to a pressing of the "Yes" button or in the case the determined document type is sent to the selected destination before, the transmission application 201 included in the scanner application 200 updates the transmission history stored in the transmission history database 207 by increasing the number of times the determined type of document is transmitted to the destination selected by the user by 1 in step S317. In step S318, the transmission application 201 included in the scanner application 200 reads the image from the RAM 902*b* and sends the image file to the destination through the network I/F 950.

FIG. 4 is a diagram illustrating an example of document type determination process in the MFP according to the first embodiment. For example, as a result of the reading control service 204 performing OCR on an image of a document as illustrated in FIG. 4, character strings such as "INVOICE", "TO: ABC COMPANY", and "No. 1234" are obtained. The reading control service 204 checks whether any of these character strings is included in a group of keywords indicating the document type defined in advance or registered by the user. Then, as illustrated in FIG. 4, in the case the character string "INVOICE" is found, the reading control service 204 determines that the document type is invoice.

Figure 5:
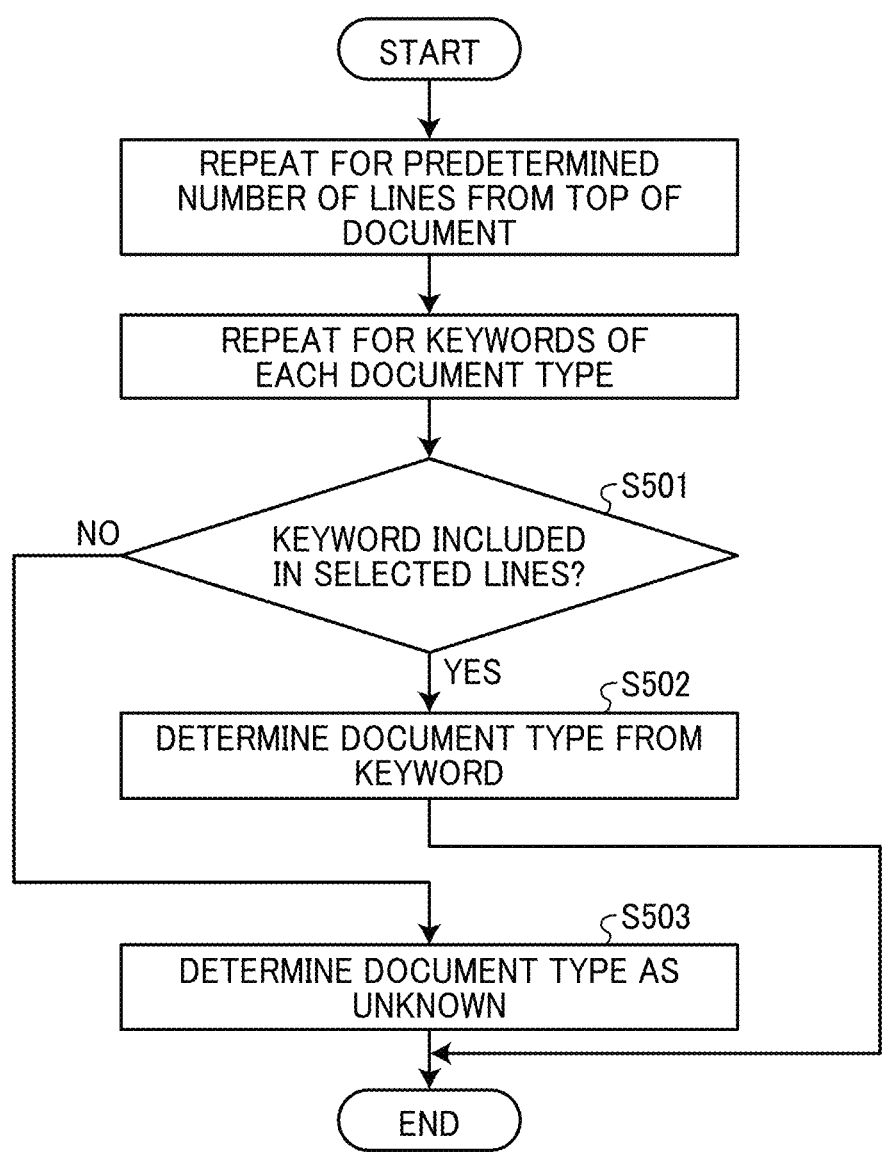
FIG. 5 is a flowchart illustrating an example of the document type determination process in an information processing system according to the first embodiment.

FIG. 5 is a flowchart illustrating an example of the document type determination process in an information processing system according to the first embodiment. A character string indicating the document type is often located at the top of the document. Therefore, the reading control service 204 extracts OCR results for a certain number of lines (for example, about several lines) from the top of the document, and repeats the following process on the extracted OCR results.

In step S501, the reading control service 204 determines whether there is a keyword indicating the document type for each keyword from among a group of keywords included in the line from which the OCR result is obtained. In the case a keyword indicating the document type is found (step S501: Yes), the reading control service 204 determines the document type based on the keyword in step S502.

On the other hand, in the case the keyword indicating the document type is not found (step S501: No), the reading control service 204 determines whether the next keyword from the group of keywords is a keyword indicating the document type. In step S503, in the case the keyword indicating the document type is not found among the group of keywords included in the OCR result of certain number of lines, the reading control service 204 determines that the document type is unknown.

FIG. 6 is a diagram illustrating an example of keywords used to determine the document type in the information processing system according to the first embodiment. In the case the document types include "Invoice," "Bill of delivery," "Transportation expense related document," "Meeting material," and the like, the reading control service 204 defines (sets) character strings of keywords indicating each document type in advance. The keyword may be in a form that is predefined and blocked from modification by the user, or may be in a form that the user is allowed to modify or register.

A plurality of keywords may be stored. In the present embodiment, a maximum of four keywords are indicated, but there may be more or fewer keywords. In the example of the invoice, there are keywords such as "bill," "check," "account," and "invoice." In the case a character string matching these keywords appears at the top of the document when the document is subjected to OCR, the reading control service 204 determines the document type to be the invoice.

FIGS. 7A and 7B are diagrams illustrating an example of the transmission history stored in the information processing system according to the first embodiment. An example of the transmission history is described below. As illustrated in FIGS. 7A and 7B, the transmission history stored in the transmission history database 207 includes the user ID, the destination to which the document is sent, the document type sent, the number of times the document is sent, and the date that the document is sent for the last time.

For example, when user A reads and sends an invoice to the destination "keiri@xyz.com", the transmission application 201 does not store transmission history for user A's destination "keiri@xyz.com" before transmission, as illustrated in FIG. 7A. Accordingly, the operation panel control service 202 displays the message "This is the first time to send a document of this type to the specified destination. Is the destination correct?" In response to the user selecting "Yes" to the message, the document is transmitted, and the transmission application 201 stores the transmission history of user A's transmission of the invoice to the destination "keiri@xyz.com" in the transmission history database 207 as illustrated in FIG. 7B.

In another example, in the case a bill of delivery to the destination "doc@xyz.com" is read and transmitted by an operation by the user B, the transmission history stored in the transmission history database 207 includes a date that is more than 5 months ago from the current time (for example, Sep. 14, 2022) as the date when the user B last made transmission to the destination "doc@xyz.com". Accordingly, the operation panel control service 202 displays a message "This document type is not sent to the specified destination since five months. Is the destination correct?" to the user.

FIG. 8 is a diagram illustrating an example of the confirmation message displayed by the information processing system according to the first embodiment. In the case the user has not sent a message to the destination specified by the user, the operation panel control service 202 displays a screen including the confirmation message "This is the first time to send a document of this type to the specified destination. Is the destination correct?" followed by the destination specified by the user, and the document type estimated (determined) by OCR as illustrated in FIG. 8. This facilitates the user to confirm the confirmation message. In the case the document type estimated by OCR is incorrect, the user can select the "Yes" button since the user is able to confirm that the result of the determination of the document type estimated by the MFP 9 is incorrect.

An example where the destination specified by the user is the destination that has not been used before is described above. In the case the destination or document type that has been used once in the past, the operation panel control service 202 may display a confirmation message such as "This is the second time to send this document type to the specified destination. Is the destination correct?" to prompt the user to confirm whether the destination is correct. The transmission frequency (for example, the number of transmissions) that generates confirmation may be set in advance on the system, or may be changed to any number by the user.

FIG. 9 is a diagram illustrating another example of the confirmation message displayed in the information processing system according to the first embodiment. In the case a destination is specified for the first time in a while (for example, five months since the user last sent a document), the operation panel control service 202 displays a confirmation message stating "This type of document is not sent to the specified destination since five months. Is the destination correct?" followed by the destination specified by the user and the document type estimated by the OCR. This facilitates the user to confirm the confirmation message.

The "since five months" included in the confirmation message illustrated in FIG. 9 is variable, and changes depending on the number of days since the last transmission date, such as "since one year" or "since three weeks." The transmission frequency (for example, period) that generates confirmation may be fixed to a period such as one month, or may be changed to any number of days by the user in the initial settings.

As described above, according to the information processing system of the first embodiment, based on determination that the destination of the document is to be confirmed according to the transmission frequency at which a predetermined document type is sent to a predetermined destination, the user is prompted to confirm the destination, resulting in reduction of erroneous transmission of the document. Especially in the case an appropriate destination is fixed for each document type, the erroneous transmission, such as sending an inappropriate type of document to a wrong destination is reduced.

A second embodiment is an example in which the document type is determined based on a document type input by a user. In the following description, description of configurations similar to those of the first embodiment is omitted.

In the present embodiment, the reading control service 204 determines the document type based on the document type input by the user. Accordingly, even in an environment (image reading device or image reading system) where the OCR is not available, the possibility of erroneous image transmission is reduced by allowing the user to manually specify the document type.

Figure 10:
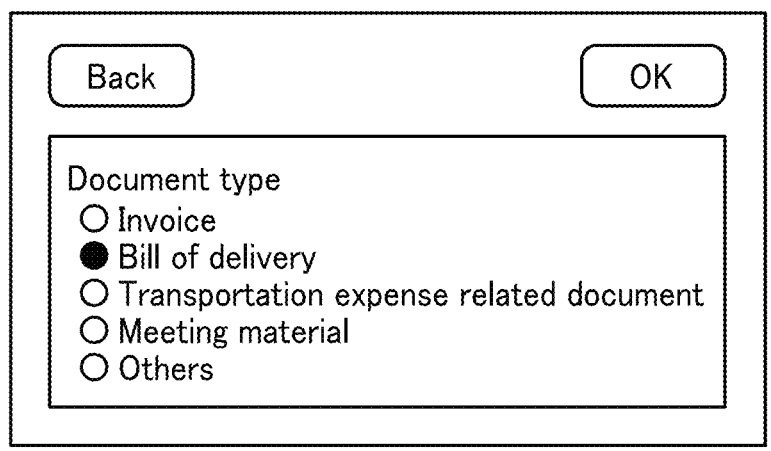
FIG. 10 is a diagram illustrating an example of a selection screen displayed on the MFP according to a second embodiment.

FIG. 10 is a diagram illustrating an example of a selection screen displayed on the MFP according to the second embodiment. In the case the user is to specify the document type, the operation panel control service 202 displays a selection screen in which the document type is to be selected from among five types: "Invoice," "Bill of delivery," "Transportation expense related document," "Meeting material," and "Others." The documents other than "Others" are the document types illustrated in FIG. 6. The options may be more or less than five. Further, the options may be defined in advance in the device program, or may be registered by the user on an initial settings screen or the like of the device. The option "Others" is preferred to be provided for a document that does not fit into any of the document types.

Figure 11:
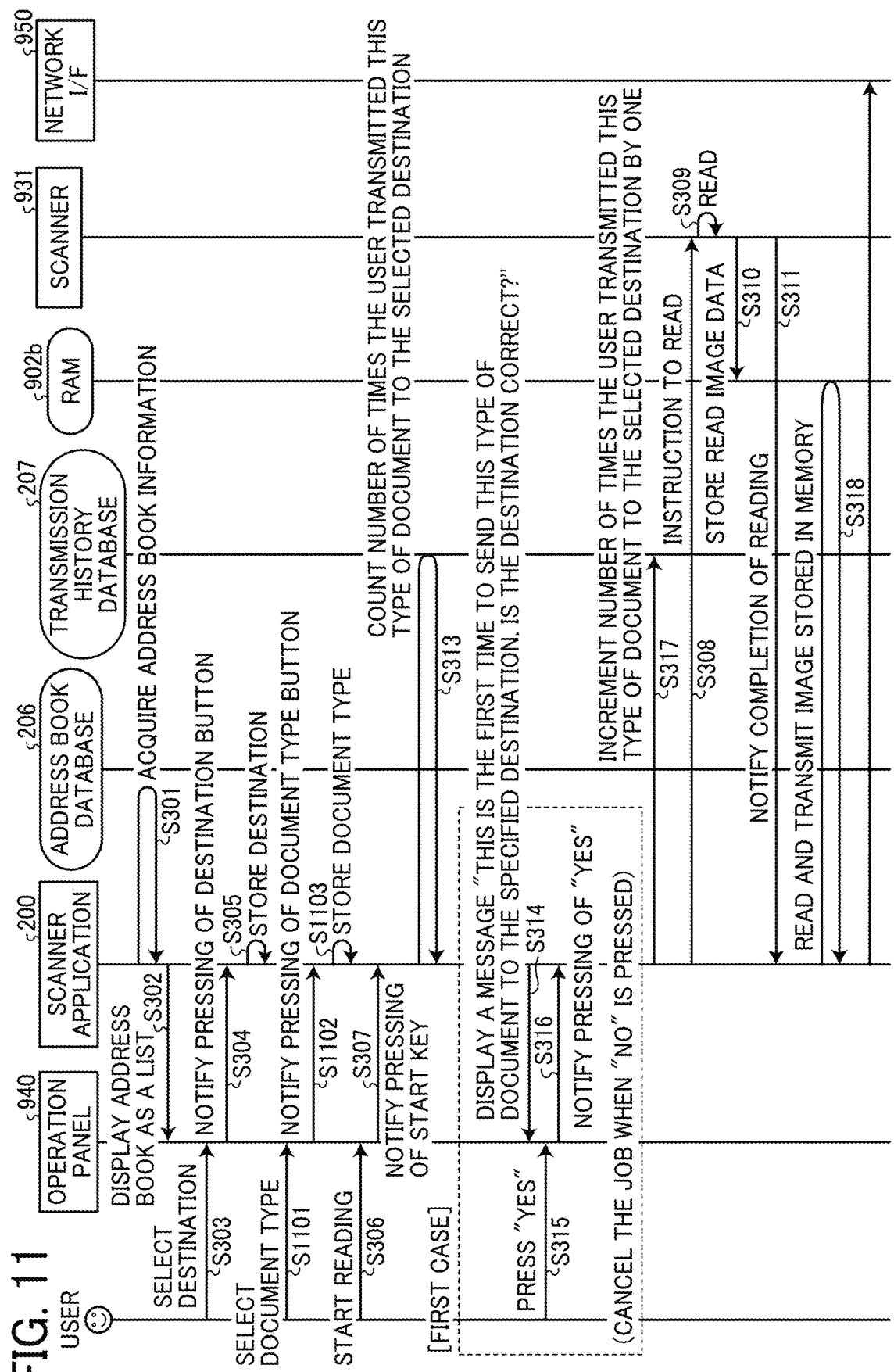
FIG. 11 is a sequence diagram illustrating an example of a process to prevent the erroneous transmission in the MFP according to the second embodiment.

FIG. 11 is a sequence diagram illustrating an example of a process to prevent the erroneous transmission in the MFP according to the second embodiment. In the following description, description of processes similar to those in FIG. 3 is omitted. In the present embodiment, the operation panel 940 is controlled by the operation panel control service 202 included in the scanner application 200 and displays a selection screen before the user presses the reading start button. In response to a selection of the document type on the selection screen by the user in step S1101, the operation panel 940 notifies the reading control service 204 of the scanner application 200 of the selected document type in step S1102. In step S1103, the reading control service 204 included in the scanner application 200 temporarily stores the selected document type.

In response to receiving a notification that the reading start button is pressed in step S307 by the reading control service 204 of the scanner application 200, the transmission application 201 included in the scanner application 200 refers to the transmission history stored in the transmission history database 207 and checks how many times the selected document type has been sent to the destination selected by the user in step S313. In the present embodiment, the reading control service 204 included in the scanner application 200 refers to image data stored in the RAM 902b and does not perform OCR. The order of the process in which the user selects the destination and the process in which the user selects the document type may be reversed.

As described above, according to the information processing system of the second embodiment, even in an environment (an image reading device or an image reading system) where OCR is not available, the user manually specifies the document type, and the image is processed. Accordingly, the possibility of erroneous transmission is reduced.

A third embodiment is an example in which an address book database and a transmission history database are stored in first and second servers outside the MFP. In the following description, description of configurations similar to those of the above-described embodiments is omitted.

Figure 12:
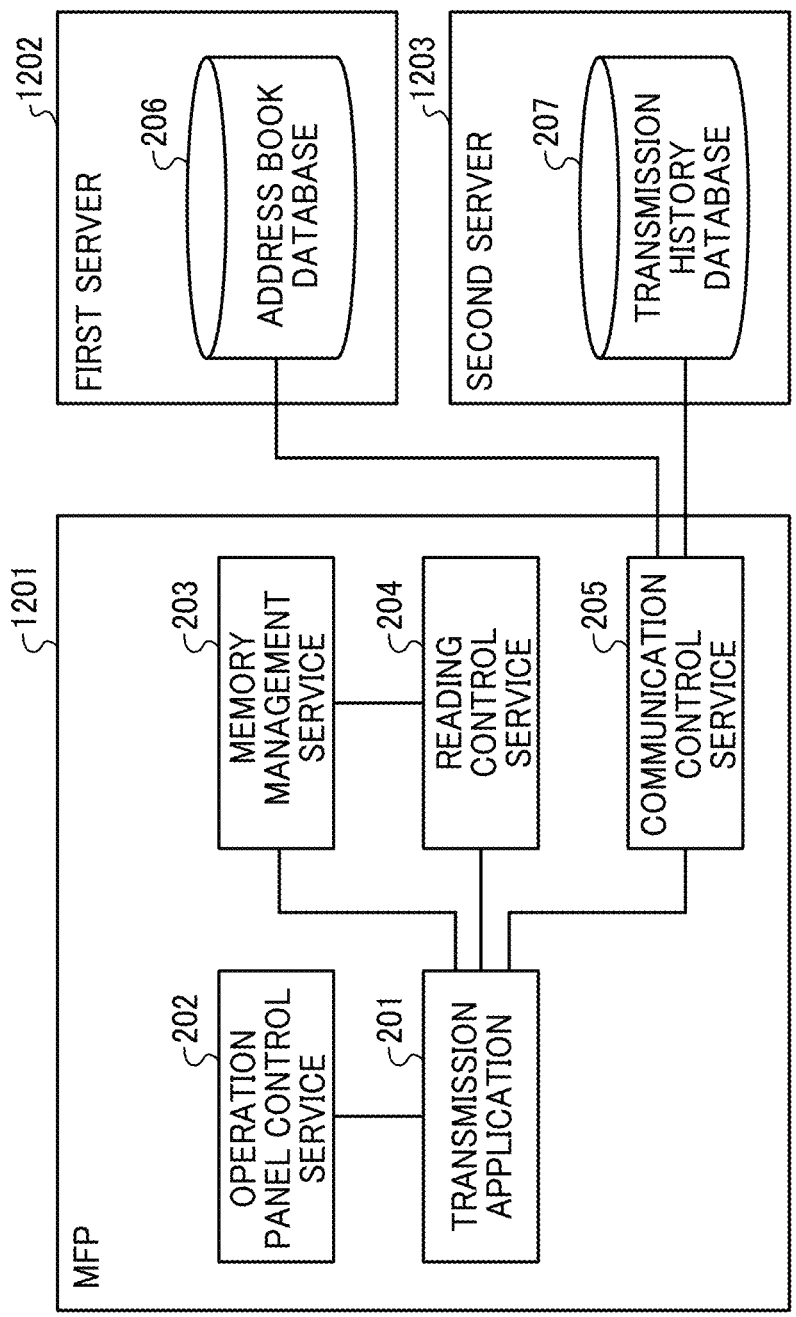
FIG. 12 is a block diagram illustrating an example of a functional configuration of the information processing system according to a third embodiment.

FIG. 12 is a block diagram illustrating an example of a functional configuration of the information processing system according to the third embodiment. As illustrated in FIG. 12, the information processing system according to the present embodiment includes an MFP 1201 that is an example of the image reading device, a first server 1202, and a second server 1203. In the information processing system illustrated in FIG. 2, the address book database 206 and the transmission history database 207 are implemented inside the MFP 9, but in the present embodiment, the address book database 206 and the transmission history database 207 are implemented in the first server 1202 and the second server 1203 respectively, outside the MFP 1201 as illustrated in FIG. 12.

Specifically, the first server 1202 is provided outside the MFP 1201 and functions as an example of an address book server that stores the address book database 206. The second server 1203 is provided outside the MFP 1201 and functions as an example of a history management server that stores the transmission history database 207.

In the present embodiment, the process for preventing erroneous transmission in the information processing system is not significantly different from the sequence illustrated in FIG. 3 or FIG. 11. However, the transmission application 201 differs in that when accessing the address book database 206 and the transmission history database 207, the transmission application 201 accesses the databases through the communication control service 205.

Figure 13:
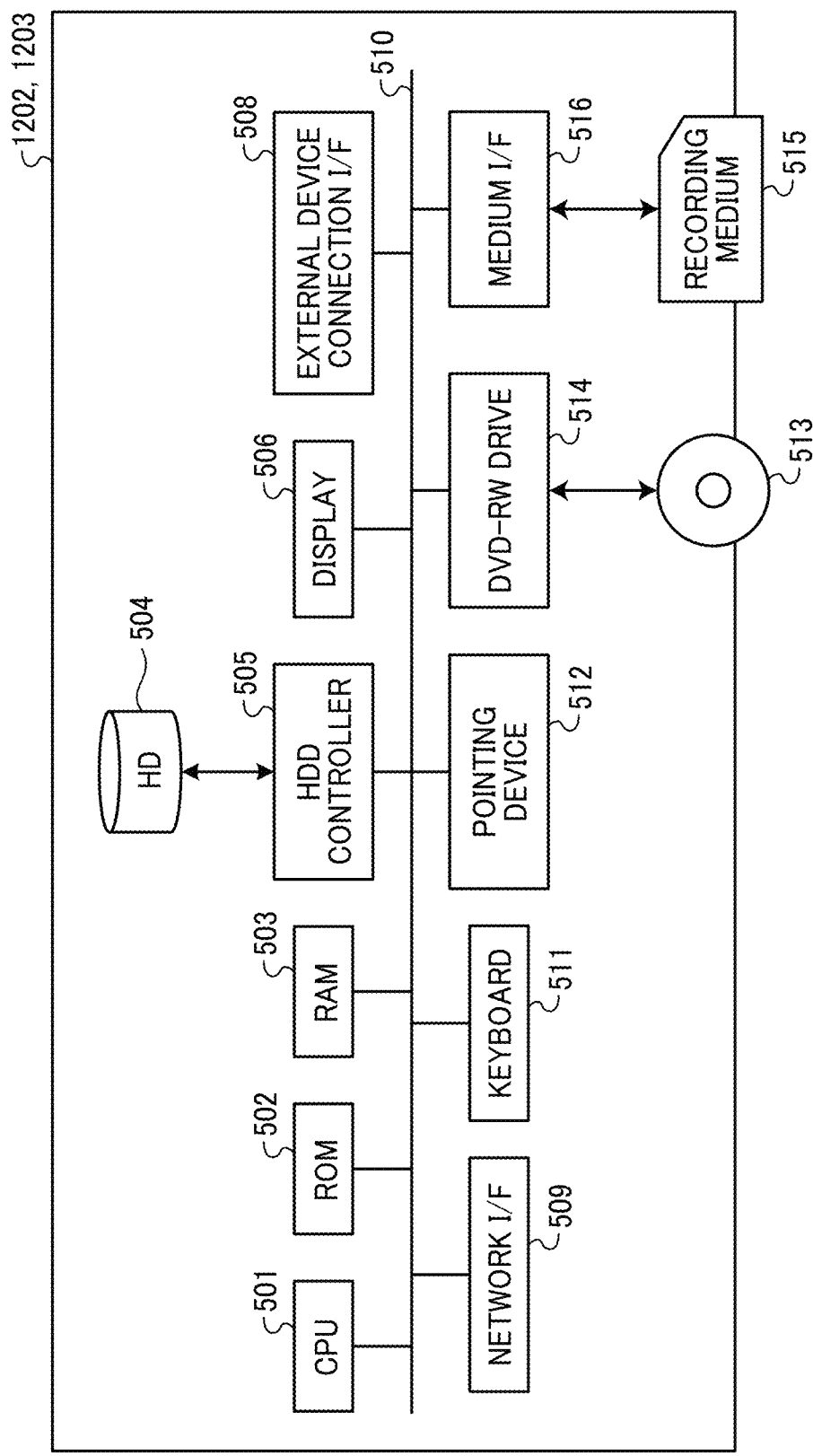
FIG. 13 is a block diagram illustrating an example of a hardware configuration of first and second servers included in the information processing system according to the third embodiment.

FIG. 13 is a block diagram illustrating an example of a hardware configuration of the first and second servers included in the information processing system according to the third embodiment. The hardware configuration of the first server 1202 is described below.

As illustrated in FIG. 13, the first server 1202 is implemented by a computer, and includes a CPU 501, a ROM 502, a RAM 503, an HD 504, an HDD controller 505, a display 506, an external device connection I/F 508, a network I/F 509, a bus line 510, a keyboard 511, a pointing device 512, a digital versatile disk-rewritable (DVD-RW) drive 514, and a medium I/F 516.

Among these elements, the CPU 501 controls the entire operation of the first server 1202. The ROM 502 stores a control program such as an initial program loader (IPL) to boot the CPU 501. The RAM 503 is used as a work area for the CPU 501. The HD 504 stores various data such as programs. The HDD controller 505 controls reading or writing of various data with respect to the HD 504 under the control of the CPU 501. The display 506 displays various information such as a cursor, menu, window, character, or image. The external device connection IF 508 is an interface for connecting various external devices. External devices in this case include, for example, a USB memory and a printer. The network I/F 509 is an interface for performing data communication through the communication network. The bus line 510 is an address bus, a data bus, and the like for electrically connecting each component such as the CPU 501 illustrated in FIG. 13.

The keyboard 511 is an example of the input device provided with a plurality of keys for enabling a user to input characters, numerals, and various instructions. The pointing device 512 is an example of the input device for selecting and executing various instructions, selecting a processing target, moving a cursor, and the like. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading or writing (storing) of data with respect to a recording medium 515 such as a flash memory.

As described above, according to the information processing system of the third embodiment, even when the address book database 206 and the transmission history database 207 are implemented outside the MFP 1201, the same effects as in the first and second embodiments are obtained. Further, since a storage device for storing the address book database 206 and the transmission history database 207 is not provided in the MFP 1201, the size and cost of the MFP 1201 is reduced.

A fourth embodiment is an example in which the second server executes a process to determine the document type and a process to determine whether to confirm the destination. In the following description, description of configurations similar to those of the third embodiment is omitted.

Figure 14:
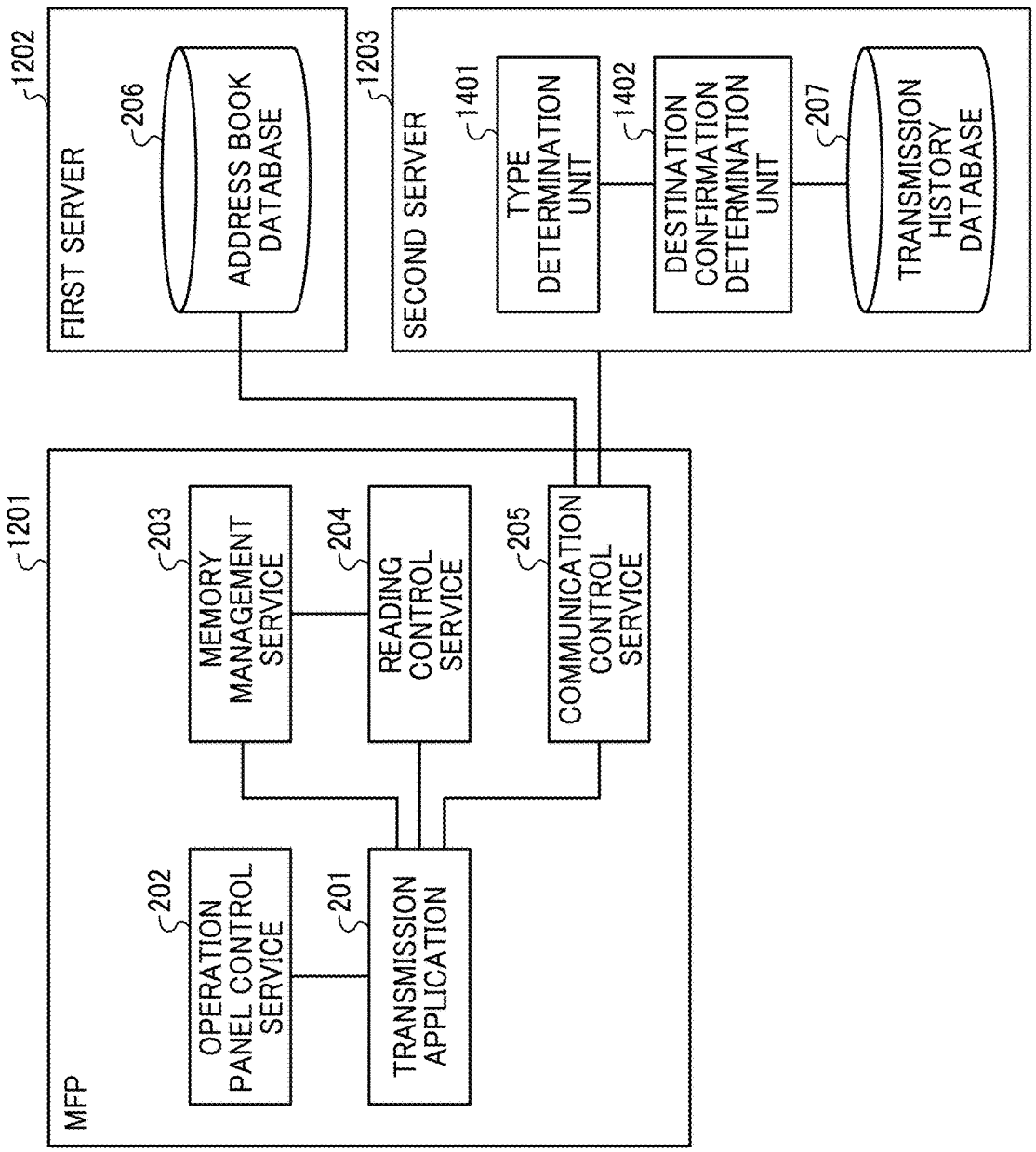
FIG. 14 is a block diagram illustrating an example of a functional configuration of the information processing system according to a fourth embodiment.

FIG. 14 is a block diagram illustrating an example of a functional configuration of the information processing system according to the fourth embodiment. In the present embodiment, the second server 1203 includes a type determination unit 1401 and a destination confirmation determination unit 1402 in addition to the transmission history database 207.

In the present embodiment, the type determination unit 1401 functions as an example of the determination unit to determine the document type based on an image read by the scanner 931 of the MFP 9 using the OCR technology or the like.

In the present embodiment, the destination confirmation determination unit 1402 functions as an example of the determination unit to determine whether to confirm the destination based on the transmission frequency at which images of the document type determined by the type determination unit 1401 are transmitted to a predetermined destination.

As described above, according to the information processing system of the fourth embodiment, even when the second server 1203 executes the process of determining the document type and the process of deciding whether to confirm the destination, the same effects as those of the above-described embodiments are obtained.

The apparatuses or devices described in the present embodiment are merely one example of plural computing environments that implement one or more embodiments disclosed herein. In some embodiments, the MFP 1201 includes multiple computing devices, such as a server cluster. The multiple computing devices are configured to communicate with one another through any type of communication link, including a network, shared memory, and the like, and perform the processes disclosed herein. Similarly, the first server 1202 and the second server 1203 may include multiple computing devices configured to communicate with each other. Similarly, the functions of the MFP 1201 are executable by the first server 1202 and the second server 1203. Further, each element of the MFP 1201 and the first server 1202 and the second server 1203 may be combined into one server, or may be divided into multiple devices.

The program to be executed by the MFPs 9 and 1201 of the present embodiment are provided as being pre-installed in the ROM 902a or the like. The program executed by the MFP 9 according to the present embodiment may be stored in a computer readable storage medium, such as a compact disc read only memory (CD-ROM), a flexible disk (FD), a compact disc recordable (CD-R), and a digital versatile disk (DVD), in an installable or executable file format for distribution.

Furthermore, the program executed by the MFPs 9 and 1201 according to each embodiment can be stored in a computer connected to a network such as the internet and downloaded through the network. Further, the program executed by the MFPs 9 and 1201 according to each embodiment can be provided or distributed through a network such as the internet.

The program executed by the MFPs 9 and 1201 of the embodiments of the present disclosure has a module configuration including the above-mentioned units (transmission application 201, operation panel control service 202, memory management service 203, reading control service 204, and communication control service 205). In actual hardware, a processor such as the CPU 901 reads a program from the ROM 902a and executes the program, causing each of the above units loaded onto the main storage device and the transmission application 201, the operation panel control service 202, the memory management service 203, the reading control service 204, and the communication control service 205 are created on the main storage device.

Aspects of the present disclosure are, for example, as follows.

According to a first aspect, an image reading device includes a reading unit to read an image of a document, a transmission unit to transmit the image to a predetermined destination, a type determination unit to determine a document type of the document based on the image, a determination unit to determine whether to confirm a destination based on a frequency with which the image of the determined document type is transmitted to the predetermined destination, and a display control unit to display a screen to confirm the destination on a display unit based on a determination that the destination is to be confirmed.

According to a second aspect, the image reading device of the first aspect further includes a user identification unit to identify a user using the image reading device referring to an address book server external to the image reading device, a recording function unit to record a transmission history including a destination to which the user identified by the user identification unit transmitted the image in the past, on a history management server external to the image reading device, and the determination unit determines whether the predetermined destination is a destination used for the first time by the user based on the transmission history recorded by the recording function unit and determines whether to confirm the destination according to the frequency including a result of the determination.

According to a third aspect, in the image reading device of the first aspect or the second aspect, the determination unit determines that the destination is to be confirmed based on a determination that a transmission of the image of the determined document type to the predetermined destination is the first time.

According to a fourth aspect, the image reading device of any one of the first aspect to the third aspect, the determination unit determines that the destination is to be confirmed in a case the image of the determined document type was sent to the predetermined destination more than a predetermined period of time ago.

According to a fifth aspect, the image reading device of any one of the first aspect to the fourth aspect, the determination unit determines the document type using a character recognition technology.

According to a sixth aspect, the image reading device of any one of the first aspect to the fifth aspect, the determination unit determines the document type based on a document type input by a user.

According to a seventh aspect, an image reading method includes reading an image of a document, transmitting the image to a predetermined destination, determining a document type of the document based on the image, deciding whether to confirm a destination based on a frequency with which the image of the determined document type is transmitted to the predetermined destination, and displaying a screen to confirm the destination on a display unit based on a determination that the destination is to be confirmed.

According to an eighth aspect, a program to cause a general computer to function as a transmission unit to transmit an image of a document read by a reading unit to a predetermined destination, a type determination unit to determine a document type of the document based on the read image, a determination unit to determines whether to confirm a destination based on a frequency with which the image of the determined document type is transmitted to the predetermined destination, and a display control unit to display a screen to confirm the destination on a display unit based on a determination that the destination is to be confirmed.

According to a ninth aspect, an information processing system includes an image reading device and a server, the image reading device includes a reading unit to read an image of a document, a transmission unit to transmit the image to a predetermined destination, and a display control unit to display a screen to confirm the destination on a display unit and the server includes a type determination unit to determine a document type of the document based on the image read by the reading unit of the image reading device, a determination unit to determines whether to confirm a destination based on a frequency with which the image of the determined document type is transmitted to the predetermined destination, and the display control unit to display a screen to confirm the destination on a display unit based on a determination that the destination is to be confirmed.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image reading device comprising:
   a scanner to read a document into an image, the image to be transmitted to a predetermined destination; and circuitry configured to:
> determine a document type of the document based on the image;
> determine whether to confirm the predetermined destination based on a frequency with which an image of the determined document type is transmitted to the predetermined destination;
> display, on a display, a screen to confirm the predetermined destination based on a determination indicating that the predetermined destination is to be confirmed; and
> transmit the image to the predetermined destination based on a confirmation, wherein
> the circuitry is further configured to determine that the predetermined destination is to be confirmed in a case the image of the determined document type was sent to the predetermined destination more than a predetermined period of time ago.

2. The image reading device of claim 1, wherein the circuitry is further configured to:
> identify a user using the image reading device referring to an address book server external to the image reading device;
> record a transmission history including a destination to which the user has transmitted the image in the past, on a history management server external to the image reading device; and
> determine whether the predetermined destination is a destination used for the first time by the user based on the transmission history, the determination indicating whether to confirm the predetermined destination according to the frequency including a result of the determination based on the transmission history.

3. The image reading device of claim 1, wherein
the circuitry is configured to determine that the predetermined destination is to be confirmed based on a determination that a transmission of the image of the determined document type to the predetermined destination is the first time.

4. The image reading device of claim 1, wherein
the circuitry is configured to determine the document type using a character recognition technology.

5. The image reading device of claim 1, wherein
the circuitry is configured to determine the document type based on a document type input by a user.

6. The image reading device of claim 1, wherein the frequency with which the image of the determined document type is transmitted to the predetermined destination is obtained from a transmission history database in which at least the destination to which the image is transmitted, the document type of the transmitted document determined based on the image, and the number of times the image of the determined document type is transmitted to the destination are stored.

7. An image reading method comprising:
> reading a document into an image;
> receiving input or selection of a predetermined destination to which the image is sent;
> determining a document type of the document;
> determining whether to confirm the predetermined destination based on a frequency with which the image of the determined document type is transmitted to the predetermined destination;
> displaying, on a display, a screen to confirm the predetermined destination based on a determination indicating that the predetermined destination is to be confirmed; and
> transmitting the image to the predetermined destination based on a confirmation, wherein the method further comprises determining that the predetermined destination is confirmed in a case the image of the determined document type was sent to the predetermined destination more than a predetermined period of time ago.

8. A non-transitory recording medium storing a plurality of instructions which, when executed by one or more processors, causes the processors to perform the image reading method of claim 7.

9. The image reading method claim 7, wherein the frequency with which the image of the determined document type is transmitted to the predetermined destination is obtained from a transmission history database in which at least the destination to which the image is transmitted, the document type of the transmitted document determined based on the image, and the number of times the image of the determined document type is transmitted to the destination are stored.

* * * * *